P. Kuntz,
Corn Planter.
No. 110,679. Patented Jan. 3, 1871.
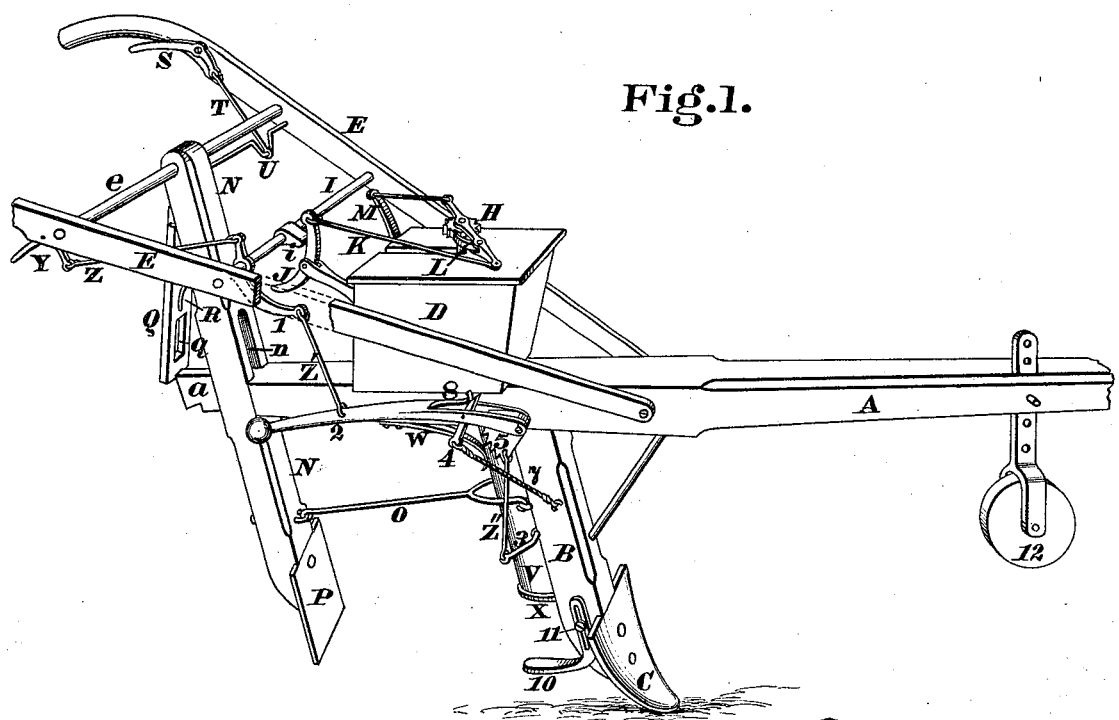
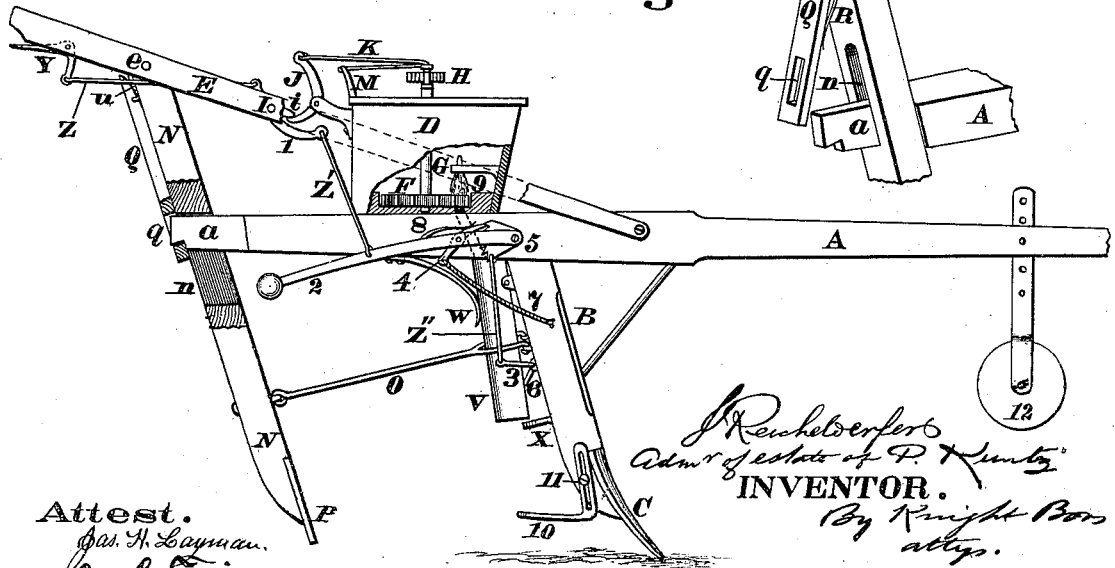

United States Patent Office.

JOHN REICHELDERFER, OF CRIDERSVILLE, OHIO, ADMINISTRATOR OF PHILIP KUNTZ, DECEASED.

Letters Patent No. 110,679, dated January 3, 1871.

IMPROVEMENT IN CORN-PLANTERS.

The Schedule referred to in these Letters Patent and making part of the same.

I, JOHN REICHELDERFER, of Cridersville, Auglaize county, Ohio, administrator of the estate of PHILIP KUNTZ, deceased, late of said county, do declare that said PHILIP KUNTZ in his lifetime invented a new and useful Improved Corn-Planter, of which the following is a specification.

Nature and Objects of the Invention.

This is an arrangement to enable the husbandman to furrow, drop, and cover at one operation and in the most effectual manner.

Figure 1 is a perspective view of the planter with the parts in position for dropping the grain from the hopper or seed-box into the discharge-spout, the coverer being elevated.

Figure 2 is a partially-sectioned elevation of the planter with the dropper at rest, the discharging-spout being open and the coverer depressed.

Figure 3 is a rear view of a portion of the shiftable sheath and its appurtenances.

The following parts being of usual construction need no specific description, namely, the beam A, sheath or standard B, share or shovel C, grain and box or hopper D.

The floor of the grain-box contains a common seed-distributing disk, F, whose shaft, G, ascends vertically through the top of the box, and is surmounted by a ratchet-wheel, H.

An intermittent partial rotation of the disk F is effected by means as follows:

The handles E, instead of being affixed rigidly to the beam, are merely pivoted by their front ends thereto.

These handles have a stretcher, I, provided with a tongue, $i$, which, on depressing said handles, operates an arm, J, which, being connected by rod K with feed-hand L, operates to move the feed-hand and seed-distributer, (see fig. 2.)

On the elevation of the handles a spring, M, acts to restore the feed-hand L and arm J to their normal or inactive position, (see fig. 2.)

Located some distance in rear of the fixed standard B, is the shiftable standard N.

The shiftable standard N is pivoted by its upper end to a stretcher, $e$, on the handles, with which it rises and falls, and has its lower end connected to the fixed standard by a link, O.

A slot, $n$, near the middle of the standard N, receives the tail $a$ of the beam, and is guided by it.

The lower extremity of the shiftable standard N is armed with a spade-like share or hoe, P, which, when depressed, operates to gather earth to and over the dropped grain.

The tail $a$ of the beam protrudes in rear of the shiftable standard N, and is undercut or hooked to engage (when it is desired to permanently depress the hoe P) in the eye $q$ of a catch, Q, which catch, when not so engaged, is held aloof from the tail $a$ by a spring, R.

The engagement of said catch is effected at any moment by manipulating the trigger S, which, through the medium of rod T and rock-shaft U, moves an arm or tongue, $u$, on said shaft.

The spout V, which receives grain from the hopper, is pivoted by its upper end to the fixed standard B, and in its normal position is held snugly against the back of said standard, by means of the spring W, in which position its lower or discharging end is temporarily closed by a lip, X, which projects rearwardly from the fixed standard. This spout is pulled back, so as to discharge its quantum of grain at the proper moment, by the following mechanism.

A trigger, Y, pivoted to the right handle, connects by rods Z Z′ Z″, arms 1 2 3, pawl 4, and segment-ratchet 5, with a tongue, 6, upon said arm 3, so that, by compressing the trigger Y, the arm 3 is caused to project rearwardly from the fixed share, so as to swing the spout back clear of the lip X, and thus discharge its load of grain.

The arm 2 being connected to the fixed standard B by means of a cord, 7, prevents the ratchet 5 being operated by the pawl 4, by withdrawing the latter from contact with said ratchet at every elevation of said handles, as shown in fig. 1.

The handles being depressed, the pawl 4 is restored to its position on the ratchet by the action of a spring, 8, so as to be ready for the next action of the trigger Y, (see fig. 2.)

9 is a common cut-off brush.

10 is a guide-bar, having a slotted shank traversed by a bolt, 11, by which said bar is made fast at any desired elevation.

12 is an adjustable ground-wheel, to enable the implement to be readily shifted from place to place.

Operation.

The grain-box being filled, an elevation of the handles E causes a suitable number of kernels to drop into the spout, from which, at the proper instant, they are liberated by the action of the trigger Y. Just previous to manipulating the trigger Y, the operator depresses the handles, thus restoring the pawl 4, and earthing the hoe P, so as to enable it to gather earth up to the hill of the grain. A second elevation of the handles acts to unearth the hoe just before reaching the corn, and operates simultaneously therewith to deposit the next quantum of corn in the spout V.

When it is desired to shift the planter from place to place without operating the seed-distributer, the ground-wheel 12 is lowered, and the handles being depressed are secured in that position by engaging the latch by means of the trigger S, as already described.

I do not desire to claim, broadly, a seed-dropping tube, having its lower aperture opened and closed through the medium of a trigger, and a series of rods or levers, in combination with a spring, devices of this kind having been employed for a like purpose before.

Claims.

I claim as new, and the invention of said KUNTZ—

1. The described arrangement of shiftable handles E, tongue $i$, and seed-distributing mechanism F G H J K L, in the described combination with the shiftable hoe P.

2. The spout V, pivoted at its upper end, so as to permit of its being vibrated by means of the trigger Y, through the medium of the rods Z Z' Z", arms 1 2 3, pawl 4, segment-ratchet 5, tongue 6, cord 7, and spring 8, with fixed lip X for closing the discharging end of said spout, the whole constructed and operating in manner as represented and described.

3. In the described combination with the shiftable handles E, the catch Q, spring R, and trigger mechanism S J U.

In testimony of which invention I hereunto set my hand.

JOHN REICHELDERFER,
*Administrator of Philip Kuntz, deceased.*

Witnesses:
JESHEA WINGET,
L. RUERZKA.